US005101981A

United States Patent [19]

Carbone et al.

[11] Patent Number: 5,101,981

[45] Date of Patent: Apr. 7, 1992

[54] BUNDLER/STACKER ACCUMULATOR METHOD AND ARRANGEMENT FOR MAILING SYSTEMS

[75] Inventors: Rocco J. Carbone; James S. Ramsey, both of Shelton, Conn.

[73] Assignee: Pitney Bowes Inc., Stamford, Conn.

[21] Appl. No.: 416,206

[22] Filed: Oct. 2, 1989

[51] Int. Cl.[5] .......... B07C 5/38; B65G 57/03

[52] U.S. Cl. .......... 209/548; 209/551; 209/584; 209/900; 414/790.3

[58] Field of Search .......... 209/3.1, 3.3, 548, 549, 209/551, 583, 584, 900; 53/501; 414/790.3, 790.4, 790.7

[56] References Cited

U.S. PATENT DOCUMENTS

| | | | |
|---|---|---|---|
| 3,261,464 | 7/1966 | Levy | 209/900 X |
| 3,356,361 | 12/1967 | Geisler et al. | 271/198 X |
| 3,459,300 | 8/1969 | McGuire | 209/900 X |
| 3,927,508 | 12/1975 | Campbell, III. | 53/251 |
| 4,014,784 | 3/1977 | Dunlap | 209/657 X |
| 4,167,476 | 9/1979 | Jackson | 209/3.3 |
| 4,424,660 | 1/1984 | Sato et al. | 53/540 |
| 4,601,394 | 7/1986 | Hutner | 209/3.3 |
| 4,618,055 | 10/1986 | Procelli | 198/422 |
| 4,736,571 | 4/1988 | Bucolt | 53/501 |

*Primary Examiner*—Michael S. Huppert
*Assistant Examiner*—Edward M. Wacyra
*Attorney, Agent, or Firm*—Charles R. Malandra, Jr.; David E. Pitchenik; Melvin J. Scolnick

[57] ABSTRACT

A mailing system includes a mail output system for sequentially delivering mail pieces to an accumulator, the accumulator assembling stacks of mail in response to zip code break signals from the mail output system and the count of mail pieces currently on a stack. The stacks are delivered to a bundler for holding together groups of mail directed to a common zip code destination.

5 Claims, 4 Drawing Sheets

NOTES:
1.) MINIMUM ZIP BREAK QUALIFYING COUNT=Z
2.) ACCUMULATOR FULL COUNT = A
3.) CONVEYOR COUNT=C
4.) ACCUMULATOR DESIGNED TO HOLD THE MINIMUM BANDING AMOUNT

BUNDLER/STACKER ACCUMULATOR METHOD AND ARRANGEMENT FOR MAILING SYSTEMS

FIELD OF THE INVENTION

This invention relates to a method and apparatus for accumulating stacks of mail pieces from mail pieces sequentially received from a mail output system, and for the delivery of such stack of mail pieces to a bundler apparatus.

BACKGROUND OF THE INVENTION

Inserting machines, for inserting documents in envelopes, and conveying arrangements associated therewith, are disclosed, for example, in U.S. Pat. Nos. 3,356,361; 3,935,429; 4,020,615 and 4,525,788. In accordance with USPS practice, reductions are given in postage charges for batches of mail, when more than a given number of mail pieces are directed to a given three or five digit zip code destination. Accordingly, it is known to provide zip code information, in large mailing operations, on the envelopes or on documents that are to be inserted in windowed envelopes, so that the zip code information is externally readable. It is also known to provide marks on certain pieces of such mail or inserts that indicate a zip code break, i.e. the location in a serially processed group of mail pieces at which the zip code changes.

It is also known, for example in U.S. Pat. No. 4,525,788, and application Ser. No. 915,343 filed Oct. 3, 1986 now abandoned, by G. Branecky et al, and assigned to the assignee of the present application, to provide a bundler assembly for serially receiving mail from a mail output system, the bundler assembly having a conveyor belt with partitions. In this arrangement, mail pieces from the mail output system are directed to a partitioned section of the conveyor belt until a stack of mail pieces has been accumulated thereon, the number being determined, for example, by either a maximum number that can be assembled at the given partitioned section, or the occurrence of a zip code break. The partitioned conveyor is moved after the assembly of each stack, and eventually reaches a bundling device wherein the stack of mail pieces directed to a common zip code region is fastened together, for example by a rubber band or the like.

In this arrangement, a counter is provided to count each mail piece as it is directed from the mail output system to the partitioned conveyor, and the conveyor is advanced via a control system whenever:

1. The counter has counted a given number of mail pieces directed to a given partitioned section, the number having been preset in the control system and constituting, for example, the minimum number of mail pieces that may be assembled in a given stack in order to obtain a reduction of postage.

2. A zip break signal is received from the inserter indicating that the last mail piece dropped on the stack was the last mail piece of a sequence of mail pieces having a common destination zip code. An indication was provided to the operator if the zip code break signal occurred prior to the accumulation in the stack of a number of mail pieces equal to the above set minimum number.

3. The operation by the user of a manual button that controls the advancing of the partitioned conveyor.

Various other known systems for the stacking and assembling and bundling of mail pieces, and the use of zip code break marks, are disclosed in U.S. Pat. Nos. 4,601,394; 4,167,476; 3,782,541; 3,652,828 and 3,757,939.

SUMMARY OF THE INVENTION

It is a primary object of the present invention to provide an intelligent bundler system which is capable of recognizing zip code breaks for sorting bulk mail packages and for deletion of mail pieces or packages which do not qualify for bulk mail rates.

It is another object of the present invention to provide an intelligent bundler system whose performance and operating characteristics are not dependent on the inserter type or size.

Briefly stated, the invention comprises a mailing machine including a mail output system for sequentially outputting m il pieces and including mean for providing first signals indicating zip code breaks, and a bundling apparatus for bundling stacks of mail directed to a destination having a common zip code. The bundling apparatus has a receiving conveyor with a plurality of mail receiving sections, a mail receiving position, and means for selectively moving the sections to the mail receiving position. In accordance with the invention, accumulator means are provided for sequentially receiving mail pieces from the mail output system and directing stacks of mail pieces to the receiving conveyor at the receiving station. The accumulator means comprising a tray for stacking mail pieces, an input conveyor for directing mail pieces from the mail output system to the tray, means for directing mail from the tray to the receiving position, counting means for producing second signals that are a function of the number of mail pieces received by the input conveyor, and control means responsive to the first and second signals for controlling the directing means to direct a stack of mail on the tray to the receiving station.

The directing means may comprise means for pushing stacks of mail from the tray to the receiving station. In one embodiment of the invention, the tray has a longitudinal slit therein, and the pushing means comprising a belt, a pushing projection on the belt and adapted to move in the slot along one course of the belt to push stacks of mail on the tray.

The counting means may comprise sensing means for sensing mail pieces moving toward the tray.

The control means preferably comprises computing means having means for setting a count, the computer comprising means responsive to the first signals for controlling the directing means to direct a stack of mail from the tray to the receiving station upon the positioning on the tray of the last mail piece of a group of mail pieces having a common destination zip code, and means responsive to the second signals for controlling the directing means to direct a stack of mail pieces from the tray to the receiving station when the number of mail pieces on the tray is equal to the count. The control means may comprise means for stopping the mail output system in response to the first signal, when the number of mail pieces on the tray is less than the count and mail pieces previously received by the mail receiving section have a destination zip code different from the mail pieces on the tray.

The control means also comprises means for controlling the receiving conveyor to position an empty receiving section at the receiving station in response to a first signal when a stack of mail pieces equal to the count is o the tray; means for controlling the receiving conveyor to position an empty receiving section at the receiving station when the first signal is received at the time the number of mail pieces on the tray is equal to the count; and means for controlling the receiving conveyor for inhibiting the positioning of an empty receiving section at the receiving station in response to the first signal when the number of mail pieces o the tray is less than the count and a stack of mail pieces directed to the receiving section at the receiving station has the same destination zip code.

The invention also provides a method for directing mail to a bundling apparatus from a mail output system, wherein the mail output system serially output mail and provides a first signal corresponding to zip code breaks, and the bundling apparatus has a conveying device with a plurality of receiving sections, and means for selectively positioning the receiving sections at a receiving position. This method includes accumulating stacks of sequentially received mail pieces from the mail output system on a tray, counting mail pieces on the tray and transferring the stacks of mail on the tray to the bundling apparatus in response to the first signal and in response to a count of mail pieces on the tray, equal to a preset number.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
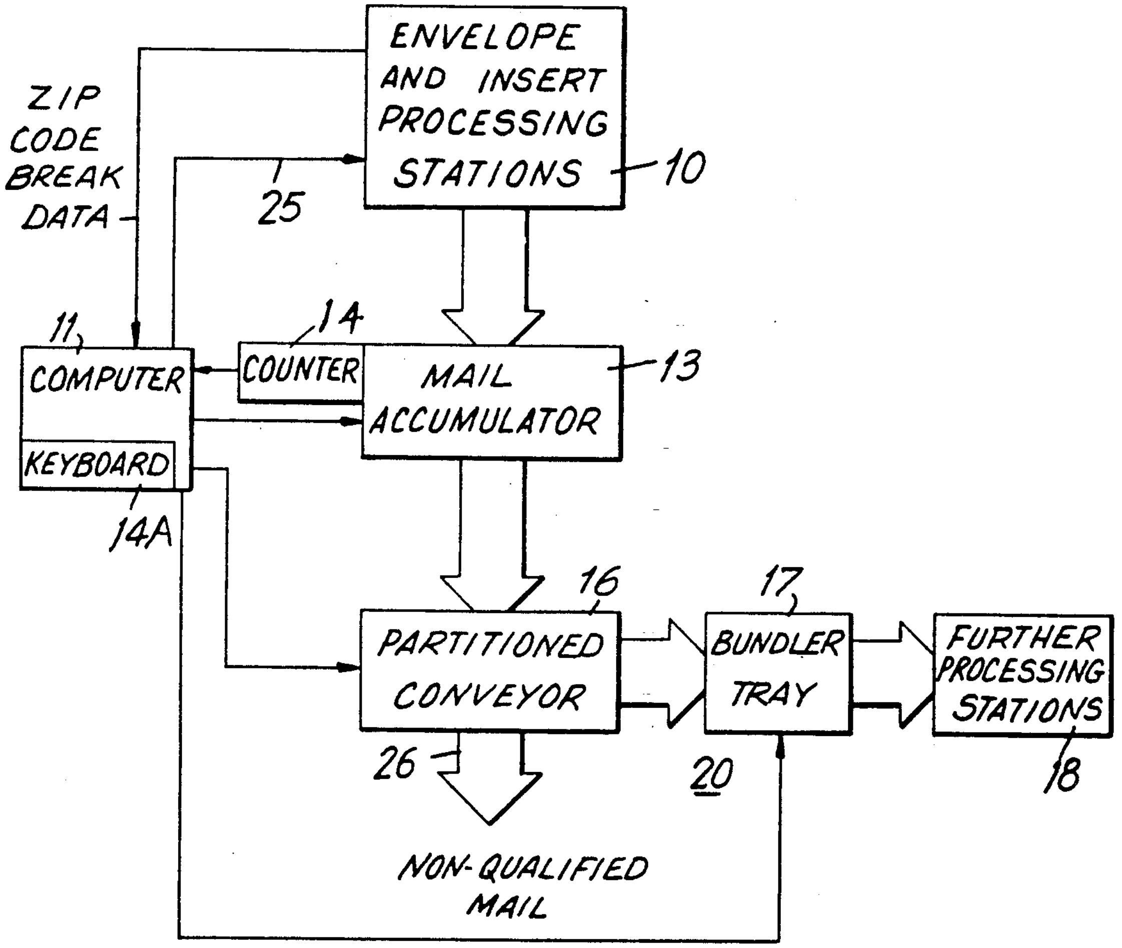
FIG. 1 is a block diagram of a mailing system that incorporates the present invention.

Referring now to the drawings, and more in particular to FIG. 1, therein is illustrated a system in which a bundler/stacker accumulator system in accordance with the invention may be employed. The apparatus is adapted to be employed as a part of a mail processing system which may include known envelope and insert processing stations 10, including, for example, inserters, burster/folders, etc., which comprise a mail output system. The mail from the stations 10 includes zip code information, which has been either been applied thereto at the stations 10, or has been previously applied thereto and read at one of the stations 10. The zip code information may include zip code break marks. One of the stations 10 outputs processing data to a computer 11, the data being comprised specifically of zip code break data, so that the computer 11 will be supplied with sufficient information to determine when the last piece of mail of a sequence having a common zip code reaches a bundler/stacker accumulator 13. This information may be based upon data sensed at one of the stations, or applied to mail pieces at one of the stations.

The mail pieces are directed via a conveyor 12 to the mail stacker/accumulator 13. The accumulator 13 includes a counter 14 for counting the number of pieces of mail that have been stacked therein following the last release therefrom of a stack of mail to a conveyor 16. The information from the counter, which may comprise a conventional article sensing device, is directed to the computer 11.

It is the function of the accumulator 13 to assemble stacks of sequentially received mail directed to a common zip code destination, for delivery to the partitioned conveyor 16. The number of mail pieces in each stack of mail delivered to the conveyor can vary up to a predetermined number that can be set by the operator in the computer 11, for example via a keyboard 14A. A bundling arrangement 20 for bundling the mail pieces, e.g. fastening together mail pieces having a common zip code, includes the partitioned conveyor 16, and a bundler tray 17. The stacks of mail accumulated by the bundler/stacker accumulator 13 are thus directed via the partitioned conveyor 16 to the bundler tray arrangement 17 for bundling stacks of mail received from the conveyor 16. Suitable output processing stations 18 may be provided for receiving the bundled stacks of mail from the bundler tray arrangement.

A mailing system including various processing stations that may be employed as the stations 10, a partitioned conveyor that may be used for the conveyor 16, and a bundler tray that may be used for the bundler tray 17, are disclosed in the above noted U.S. Pat. Application Ser. No. 915,343 now abandoned, and the disclosure of that Application is hence incorporated by reference in the present Application for showing a suitable structure and manner of operation of such equipment.

In accordance with the invention, instead of directing the mail pieces immediately from the mail output system, i.e. the processing stations 10, to the partitioned conveyor, the mail pieces are first stacked, i.e. accumulated, at the bundler/stacker accumulator 13. The computer 11, which may be of any conventional form, receives the count of the number of mail pieces that have been presently accumulated at the accumulator, and also receives a "zip code break" signal from the upstream processing stations 10, in order to control the accumulator 13 to "dump" the assembled stack of mail pieces to the partitioned conveyor 16. The zip code break signal may be conveniently based upon a five digit zip code or a three digit zip code, although it is apparent that the invention is not limited to this feature.

In accordance with the invention, a stack of mail pieces accumulated at the accumulator 13 is dumped to the partitioned conveyor at least under either of the conditions:

1. The number of sequentially received mail pieces is equal to the predetermined number set in the computer 11, or 2. In response to the receipt of a zip code break signal the computer determines that the last mail piece on the accumulated stack is the last mail piece of a sequentially received group of mail pieces having a common destination zip code.

(It is of course apparent that the stack of mail pieces may be dumped to the partitioned conveyor 16 by manual control, if desired).

In addition to controlling the dumping of conveyor 16, the computer 11 of the bundler/stacker accumulator also controls the conditions under which the conveyor 16 advances, i.e. moves an empty partition section to a position to receive a stack of mail, and moves the just dumped stack of mail pieces to or toward the bundler tray 17. In accordance with the invention, the computer 11 controls the conveyor 16 in the following manner:

1. If stack of mail pieces accumulated at the accumulator has been dumped in response to the occurrence of a zip code break signal, and the number of mail pieces in the stack is equal to the predetermined number as set by the operator, the conveyor is advanced to position the next partition section to receive a stack of mail from the accumulator.

2. If stack of mail pieces accumulated at the accumulator has been dumped in response to the occurrence of a zip code break signal, the number of mail pieces in the stack is less than the predetermined number as set by the operator, and the immediately previously dumped stack of mail pieces had the same zip code destination, the present accumulated stack is dumped to the top of the previously dumped stack on the conveyor, and the conveyor is then advanced to position the next partition section to receive a stack of mail from the accumulator.

3. If stack of mail pieces accumulated at the accumulator has been dumped in response to the occurrence of a zip code break signal, the number of mail pieces in the stack is less than the predetermined number as set by the operator, and the immediately previously dumped stack of mail pieces had a destination zip code that is not the same as that of the present stack of mail pieces, the computer stops the operation of the processing stations (e.g. via the control line 25 in FIG. 1), to permit the operator to remove this stack from the conveyor, as indicated by the arrow 26 in FIG. 1. This condition indicates that the current stack is not sufficiently large to qualify for postage discounts.

4. If the stack of mail pieces accumulated at the accumulator has been dumped in response to the accumulation of a number of mail pieces equal to the number set by the operator, instead of in response to the determination of the end of a sequence of a common zip code, and the number of mail pieces that accumulates in the accumulator 13 is equal to the set number, then the conveyor is advanced to position the next partition section to receive a stack of mail from the accumulator prior to dumping the next stack of mail pieces to the conveyor.

5. If the stack of mail pieces accumulated at the accumulator has been dumped in response to the accumulation of a number of mail pieces equal to the number set by the operator, instead of in response to the determination of the end of a sequence of a common zip code, and a zip break in the mail sequence is indicated before the number of mail pieces that accumulates in the accumulator 13 is equal to the that set number, then the conveyor is not advanced to position the next partition section to receive a stack of mail from the accumulator until after dumping the next stack of mail pieces to the conveyor.

Figure 2:
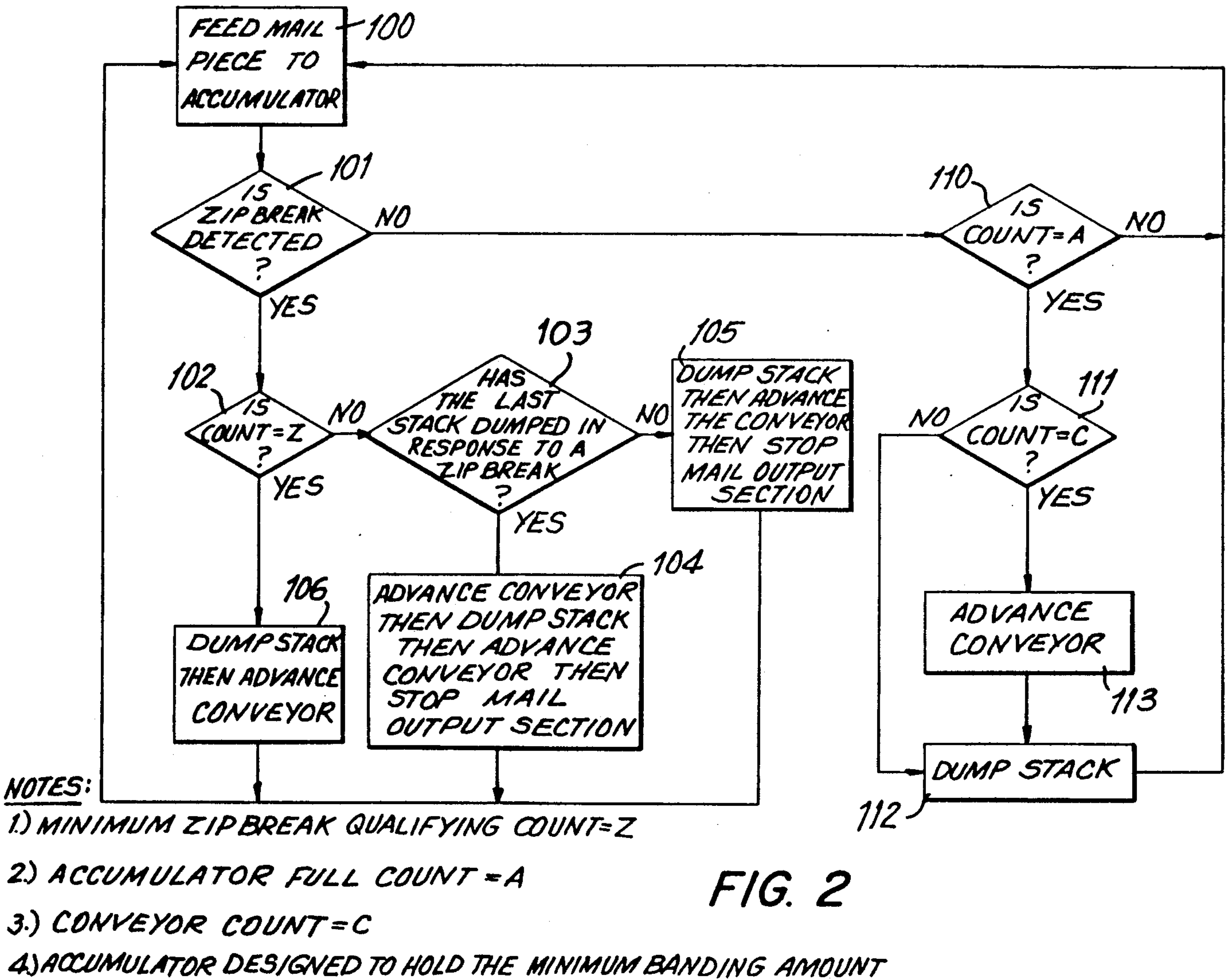
FIG. 2 is a flow diagram for the operation of a mailing system in accordance with the invention.

These steps are indicated in FIG. 2 of the drawings, wherein, as indicated at block 100, the accumulator is controlled to feed the next sequential mail piece from the mail output system to a stacking tray or equivalent station in the accumulator 13. If this mail piece corresponds to the last mail piece in a sequence having a common zip code, i.e. if a zip break signal is determined to correspond to this mail piece, at block 101, it is determined, at block 102 if the number of mail pieces currently stacked at the accumulator is equal to the number Z corresponding to the minimum zip break qualifying count, i.e. the minimum number of mail pieces required to qualify for a postage discount. If the count is not equal to Z, then a test is made, at block 103 to determine if the last stack had been dumped to the conveyor in response to a zip break. If the test of block 103 is true, then it is evident that the current stack does not qualify for a discount, so that the conveyor is advanced, then the stack is dumped to the conveyor, the conveyor is again advanced, and the mail processing system stopped, at block 104, to permit the operator to remove the stack from the bundling arrangement. If the test at block 103 is not true, however, the stack is dumped, the conveyor is then advanced, and the mail output section is stopped, as indicated at block 105.

If the count detected at block 102 was equal to Z, then it is evident that the current stack qualifies for a discount. Accordingly, the stack is dumped and the conveyor is then advanced, as indicated at block 106.

In each of the above cases, the program returns for the accumulator to receive another mail piece.

If a zip break is not detected at block 101, and the count is not equal to A, the number indicating that the accumulator is full, as tested at block 110, the accumulator is controlled to receive another mail piece. If the count at this test is equal to A, however, a test is made at block 11 to determine if the count is C, i.e. a count that represents a maximum number of mail pieces to be conveyed at each section of the conveyor. If the number in the stack is not equal to C, the stack is dumped at block 112. Otherwise the conveyor is advanced at block 113, before dumping the stack at block 112. When the stack has been dumped, at block 112, the program returns to block 100 to feed another mail piece to the accumulator.

Figure 3:
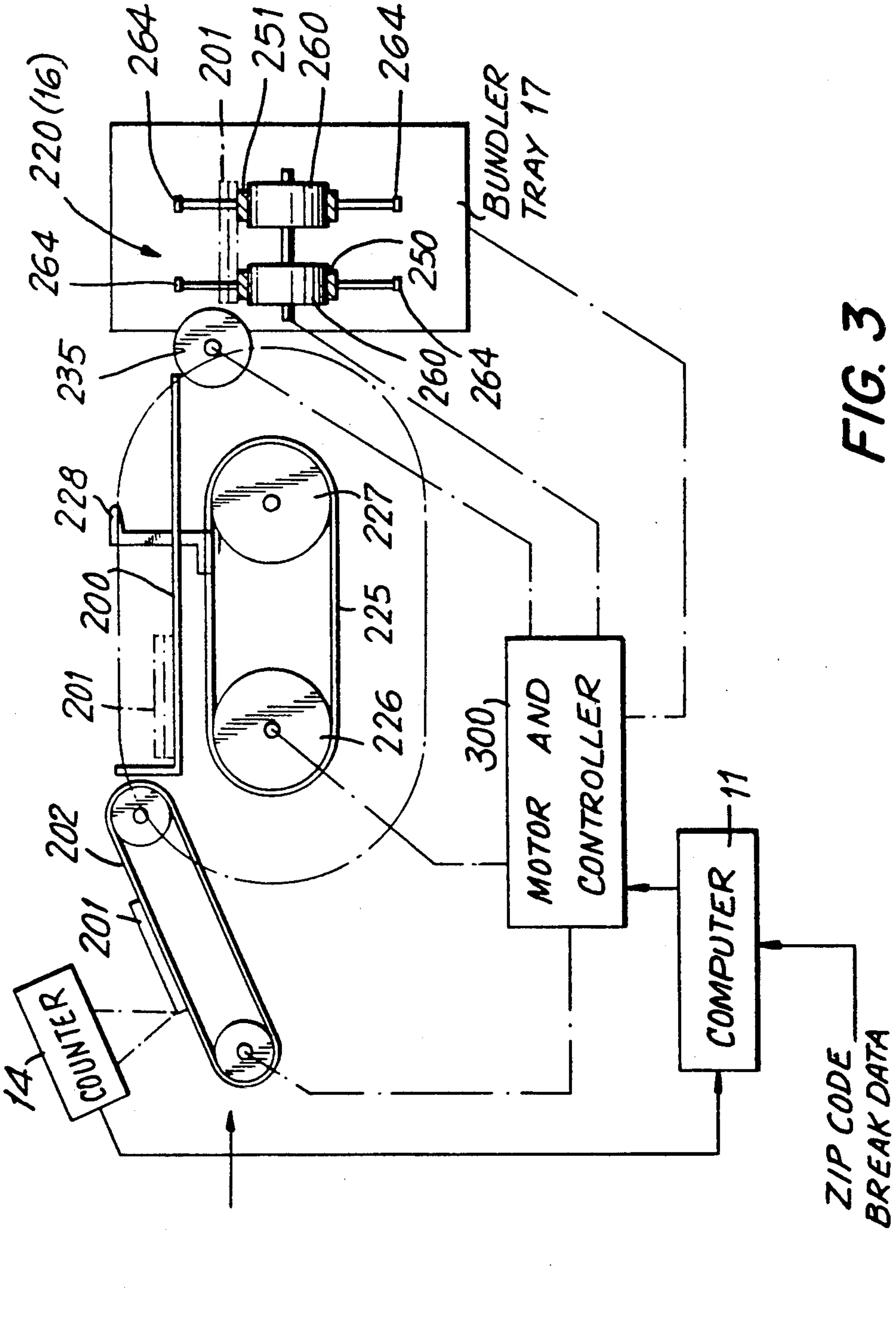
FIG. 3 is a simplified side view of a bundler/stacker accumulator in accordance with the invention.
Figure 4:
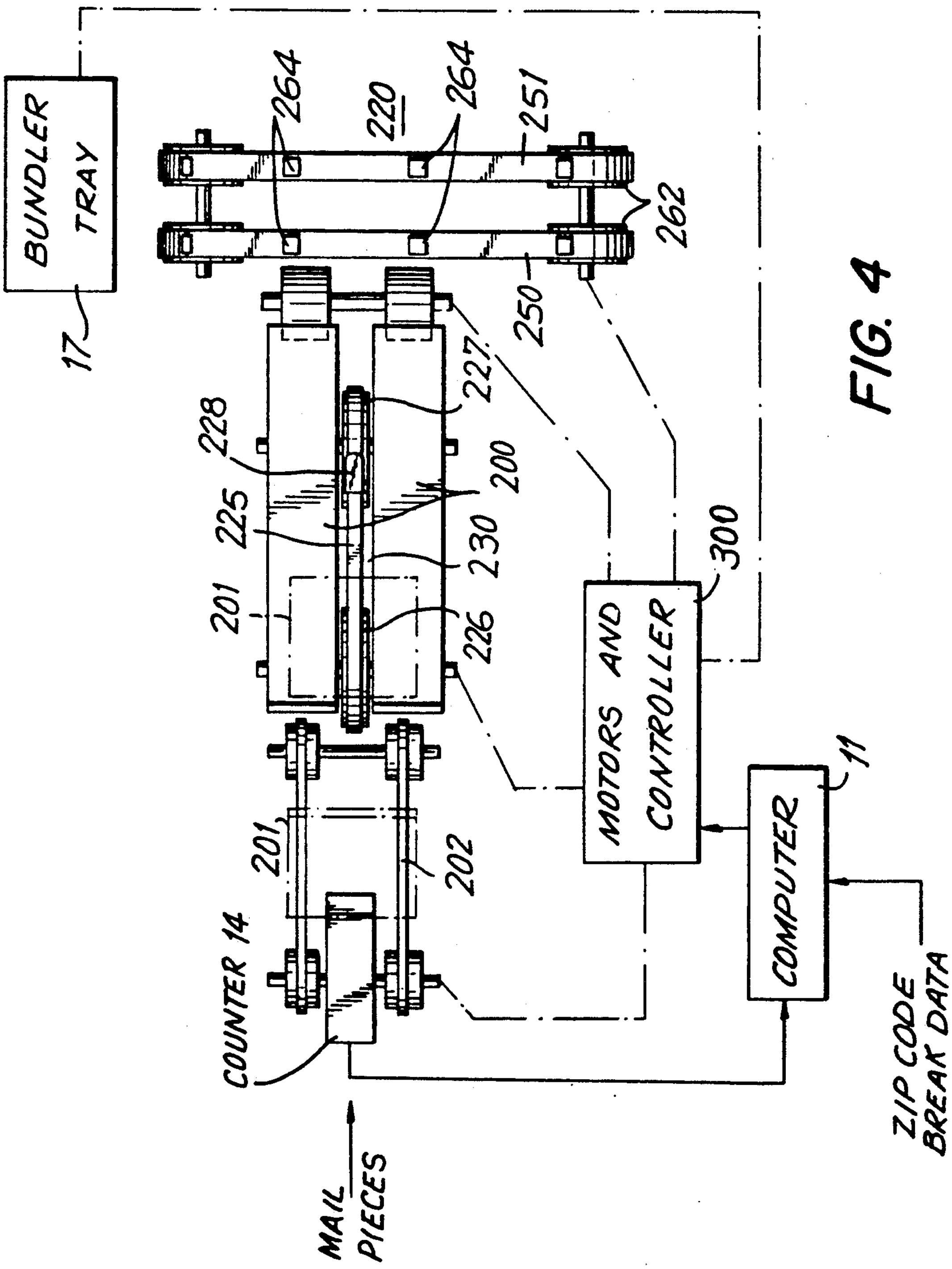
FIG. 4 is a top view of the apparatus of FIG. 3.

A structure that may be employed for the bundler/stacker accumulator, in accordance with the invention, is illustrated in FIGS. 3 and 4. This apparatus includes a tray 200 positioned to receive mail pieces, indicated by the reference numeral 201, from a conveyor 202. The conveyor 202 sequentially receives the mail pieces from the mail output system, as illustrated in FIG. 1.

The apparatus further includes the sensor counter 14 positioned to detect incoming mail pieces, for example as they come onto the conveyor 202. The counter, which may comprise a conventional optical sensing device, provides a signal to the computer 11 indicating the presence of the mail piece. As discussed above, the computer also receives a signal from the processing stations corresponding to a zip break. The computer may have data prestored therein concerning the time required for a mail piece to travel to the accumulator from the location in the upstream processing stations at which the zip break signal was detected, so that it can determine if the currently received mail piece is the last piece of mail of a group having a common zip code.

The apparatus further includes an arrangement for directing stacks of mail from the tray 200 to the partitioned conveyor 220. For this purpose, a belt 225 extending between rollers 226,227 carries a pushing projection 228. When the pushing projection is located on the upper course of the belt 225, it extends through a longitudinal slit 230 in the tray 200, the projection 220 having a shape to engage the upstream edge of a stack of mail pieces 201 on the tray and push the stack to the partitioned conveyor 220, for example over a roller 235. The belt 202 may accordingly be comprised of a pair of spaced belts in order to provide clearance for movement of the pushing projection.

It is of course apparent that the invention contemplates the use of alternative arrangements for moving a stack of mail pieces from a tray to the partitioned conveyor.

The partitioned conveyor may comprise a pair of parallel spaced apart belts 250,251 extending between rollers 260,262. Projections 264 extend outwardly from the belts 250,251 to separate the conveyor into a number of partitioned section for receiving stacks of mail pieces.

The conveyor 220 is mounted to move these stack to the bundler tray 17 for being bundled together. The projections 264 may be hinged at the belts 250,251 in order to enable them to be deflected as they pass into transfer relationship with the bundler tray. As discussed above, a suitable arrangement for the partitioned conveyor and bundler tray is disclosed in Application Ser. No. 915,343 now abandoned, although the use of other arrangements is contemplated within the invention.

As further illustrated in FIGS. 3 and 4, the computer 11 controls the operation of suitable motors and motor controllers 300, for controlling the movement of the belt 202, the belt 225 (and hence the pushing arrangement), the roller 235 (if necessary to feed the stacks to the conveyor 220 (16)), the conveyor 220 (16), and the bundler tray 17. Conventional controls and motors may be provided for this purpose to control the apparatus in the above described manner.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a mailing machine including a mail output system for sequentially outputting mail pieces and including means for providing a first signal indicating zip code breaks, and a receiving conveyor for delivering stacks of mail to a bundling apparatus, said receiving conveyor having a plurality of mail receiving sections, a mail receiving station, and means for selectively moving said sections to said mail receiving station, the improvement comprising accumulator means for sequentially receiving mail pieces from said mail output system and directing stacks of mail pieces to said receiving conveyor at said receiving station, said accumulator means comprising a tray for stacking mail pieces, an input conveyor for directing mail pieces from said mail output system to said tray, means for directing a stack of said mail pieces from said tray to a receiving section positioned at said receiving station, and counting means for producing a second signal that is a function of the number of mail pieces received by said input conveyor, and the improvement further comprising control means responsive to said first and second signals for controlling said directing means; wherein said control means comprises computer means having means for setting first and second counts, said computer means comprising means responsive to said first signal indicating the positioning on said tray of a last mail piece of a group of mail pieces having a common destination zip code and said second signal indicating that the number of mail pieces on said tray is equal to said first count for controlling said directing means to direct the stack of mail pieces from said tray to said receiving section at said receiving station; and wherein said control means further comprises means for stopping said mail output system in response to said first signal indicating the positioning on said tray of a last mail piece of a group of mail pieces having a common destination zip code and said second signal indicating that the number of mail pieces on said tray is less than said second count.

2. The mailing machine of claim 1 wherein said control means further comprises means for controlling said receiving conveyor to position an empty one of said receiving sections at said receiving station in response to said second signal when the number of mail pieces on said tray equals said first count.

3. The mailing machine of claim 1 wherein said control means further comprises means for controlling said receiving conveyor to position an empty one of said receiving sections at said receiving station when said first signal is received at the time the number of mail pieces on said tray is less than said second count.

4. In a mailing machine including a mail output system for sequentially outputting mail pieces and including means for providing a first signal indicating zip code breaks, and a receiving conveyor for delivering stacks of mail to a bundling apparatus, said receiving conveyor having a plurality of mail receiving sections, a mail receiving station, and means for selectively moving said sections to said mail receiving station, the improvement comprising accumulator means for sequentially receiving mail pieces from said mail output system and directing stacks of mail pieces to said receiving conveyor at said receiving station, said accumulator means comprising a tray for stacking mail pieces, an input conveyor for directing mail pieces from said mail output system to said tray, means for directing a stack of said mail pieces from said tray to a receiving section positioned at said receiving station, and counting means for producing a second signal that is a function of the number of mail pieces received by said input conveyor, and the improvement further comprising control means responsive to said first and second signals for controlling said directing means; wherein said control means comprises computer means having means for setting first and second counts, said computer means comprising means responsive to said first signal indicating the positioning on said tray of a last mail piece of a group of mail pieces having a common destination zip code and said second signal indicating that the number of mail pieces on said tray is equal to said first count for controlling said directing means to direct the stack of mail pieces from said tray to said receiving section at said receiving station; and wherein said control means further comprises means for inhibiting the positioning of an empty one of said receiving sections at said receiving station in response to said first signal indicating the positioning on said tray of a last mail piece of a group of mail pieces having a common destination zip code and said second signal indicting that the number of mail pieces on said tray is less than said second count whereby subsequent stacks of mail pieces having a common destination zip code, but fewer in number than said first count, are directed to the same receiving section at the receiving station.

5. In a mailing machine including a mail output system for sequentially outputting mail pieces and including means for providing a first signal indicating zip code breaks, and a receiving conveyor for delivering stacks of mail to a bundling apparatus, said receiving conveyor having a plurality of mail receiving sections, a mail receiving station, and means for selectively moving said sections to said mail receiving station, the improvement comprising accumulator means for sequentially receiving mail pieces from said mail output system and directing stacks of mail pieces to said receiving conveyor at said receiving station, said accumulator means comprising a tray for stacking mail pieces, an input conveyor for directing mail pieces from said mail output system to said tray, means for directing a stack of said mail pieces from said tray to a receiving section positioned at said receiving station, and counting means for producing a second signal that is a function of the number of mail pieces received by said input conveyor, and the improvement further comprising control means responsive to said first and second signals for controlling said directing means; wherein said control means comprises computer means having means for setting first and second counts, said computer means comprising means responsive to said first signal indicating the positioning on said tray of a last mail piece of a group of mail pieces having a common destination zip code and said second signal indicating that the number of mail pieces on said tray is equal to said first count for controlling said directing means to direct the stack of mail pieces from said tray to said receiving section at said receiving station; and wherein said control means further comprises means for inhibiting the positioning of an empty one of said receiving sections at said receiving station in response to said first signal indicating the positioning on said tray of a last mail piece of a group of mail pieces having a common destination zip code and said second signal indicating that the number of mail pieces on said tray is greater than or equal to said second count whereby subsequent stacks of mail pieces having a common destination zip code, but fewer in number than said first count, are directed to the same receiving section at the receiving station.

* * * * *